US005815012A

United States Patent [19]

Rivoir et al.

[11] Patent Number: 5,815,012

[45] Date of Patent: Sep. 29, 1998

[54] VOLTAGE TO CURRENT CONVERTER FOR HIGH FREQUENCY APPLICATIONS

[75] Inventors: Roberto Rivoir, Bari; Franco Maloberti, Torre d'Isola, both of Italy

[73] Assignee: Atmel Corporation, San Jose, Calif.

[21] Appl. No.: 691,562

[22] Filed: Aug. 2, 1996

[51] Int. Cl.[6] .................................................... H02M 11/00

[52] U.S. Cl. ........................... 327/103; 327/538; 327/543

[58] Field of Search ..................................... 327/103, 538, 327/543; 323/312, 316

[56] References Cited

U.S. PATENT DOCUMENTS

| | | | |
|---|---|---|---|
| 4,703,249 | 10/1987 | De La Plaza et al. | 323/316 |
| 5,357,156 | 10/1994 | Herrington | 327/103 |
| 5,519,310 | 5/1996 | Bartlett | 327/103 |
| 5,606,277 | 2/1997 | Feliz | 327/103 |

OTHER PUBLICATIONS

Olesin, Insepc–"Bilateral Current Source is Digitally Programmable", Sep. 1975, pp. 95 and 97.

Shih, Designer's Casebook–"Voltage–to–Current Converter Handles Bilateral Signals", May 1979, p. 124.

S. Hadri and B. Leung, "Impedance Boosting Techniques Based on BiCMOS Technology", *IEEE Journal of Solid–State Circuits,* vol. 28, No. 2, pp. 157–161, Feb. 1993.

Klaas Bult and Govert J. G. M. Geelen, "A Fast–Settling CMOS Op Amp for SC Circuits with 90–dB DC Gain", *IEEE Journal of Solid–State Circuits,* vol. 25, No. 6, pp. 1379–1384, Dec. 1990.

*Primary Examiner*—Terry Cunningham
*Attorney, Agent, or Firm*—Thomas Schneck; Rosalio Haro

[57] ABSTRACT

A fully integrated voltage-to-current converter consisting of a two-stage direct amplifier with an overall feedback network having an active differential current-to-voltage converter. The first stage of the two-stage direct amplifier is a voltage-to-voltage converter receiving an input voltage signal, and the second stage is a transconductance amplifier supplying an output current. In the overall feedback network, a voltage measure of the output current is applied to a differential amplifier which cancels out all DC components and amplifies only the AC components. The amplified AC components are fed back to the input. The feedforward gain of the two-stage direct amplifier and the feedback gain of the overall feedback network may be separately adjusted. The differential amplifier includes a local resistive feedback network such that the local gain of the differential amplifier is determined by resistor values and does not introduce any non-linear elements. The overall feedback network gain of the voltage-to-current converter may be adjusted without affecting the direct amplifier solely by varying the local resistive feedback network of the differential amplifier.

35 Claims, 10 Drawing Sheets

VOLTAGE TO CURRENT CONVERTER FOR HIGH FREQUENCY APPLICATIONS

TECHNICAL FIELD

The invention relates to integrated voltage-to-current converters of the type used in switch-current integrated circuits.

BACKGROUND ART

A voltage-to-current converter (VI), also commonly called a transconductance amplifier, is an analog circuit performing an analog conversion of an input voltage signal into an analog output current signal.

The reverse function of the VI is performed by the current-to-voltage converter (IV), or transresistance amplifier. In the past, a far greater effort of research and design has been devoted to the IV than to the VI. This is because most circuits function within the voltage domain. That is, most of the "external analog word" represents signals in voltages. Therefore, there have traditionally been far more applications for IV conversions than for VI conversions.

Recently, the need for high frequency analog integrated circuits has resulted in the development of a new analog design technique called current-mode, or switched-current (SI), technology. Current-mode techniques allow the implementation of high-performance analog circuits using digital CMOS processes. Current-mode ICs achieve higher frequency performance than voltage mode ICs because information is transmitted merely by steering current one way or another. Therefore, these circuits do not suffer from long rise/fall and settling times caused by capacitive loading associated with voltage mode ICs.

To explain the importance of VI conversion as a fundamental block in current-mode circuits, one may consider for example an analog-to-digital converter ("ADC") in the video range having a sampling operating frequency range from the low kilohertz up to 20–54 Msps or more.

With reference to FIG. 1, a current-mode implementation of an ADC needs at least a track-and-hold 11, a voltage-to-current converter 13 and a current-mode ADC. An analog voltage input signal is first applied to the tracked-and-hold 11 in the voltage domain where it is sampled. The sampled voltage is then converted to a current signal by the VI converter 13 and delivered to a current mode ADC. The track-and-hold 11 and VI 13 may be interchanged. Thus a wide frequency analog voltage input may be applied directly to the VI 13 and immediately converted to current. Therefore, a need exists for wide frequency VI converters.

There are not many examples of voltage-to-current converters in literature, especially for digital CMOS technology. A basic VI converter based on a differential amplifier 17 is shown in FIG. 2. In a good differential amplifier, Diff Amp, 17 the voltage drop across the positive and negative input terminals and the current into the input terminals are both practically zero. Since the voltage drop across the input terminals of Diff Amp 17 is practically zero, an input signal $V_{in}$ applied to the positive input terminal also appears at the negative input terminal and is thereby applied across a voltage-to-current resistor $R_{V\text{-}I}$. A current $I_R$ of magnitude $V_{IN}/R_{V\text{-}I}$ develops through resistor $R_{V\text{-}I}$. Since hardly any current flows into or out of the positive and negative input terminals of Diff Amp 17, the current $I_R$ is very similar to the output current $I_{OUT}$ supplied to a load, not shown. The output current $I_{OUT}$ is therefore practically equal to $I_R$, the current through resistor $R_{V\text{-}I}$.

However, since the Op Amp 17 is arranged as a voltage follower, the voltage series feedback tends to decrease the output impedance such that the output impedance is equal to $R_{V\text{-}I}$. Since the value of an integrated resistor is susceptible to process variations, the gain of the circuit cannot be accurately predicted. Moreover, the gain is also susceptible to temperature variations due to the temperature coefficient of an integrated resistor. As a result, the resistor $R_{V\text{-}I}$ would have to be placed external to an IC chip and the circuit could not be fully integrated.

A transistor level VI converter incorporating a Diff Amp 17 as in FIG. 2, but offering improved output impedance, is shown in FIG. 3. The VI converter of FIG. 3 incorporates the teachings of Hadri et al. in "Impedance Boosting Techniques Based on BiCMOS Technology", *IEEE Journal of Solid State Circuits,* Vol. 28, No. 2, February 1993, pp. 157–161 and the teachings of Bult et al. in "A Fast-Setting CMOS Op Amp for SC Circuits with 90-db DC Gain", *IEEE Journal of Solid State Circuits,* Vol. 25, No. 6, December 1990, pp. 1379–1381. FIG. 3 shows Diff Amp 17 and resistor $R_{V\text{-}I}$ of FIG. 2, but the output of Diff Amp 17 drives the input of an nMOS transistor 22. This configuration behaves like a "boosted" cascode amplifier and has an output impedance of $R_{V\text{-}I}+rds_{22}+(A+1)gm_{22}rds_{22}R_{V\text{-}I}$, where A is the open loop gain of Op Amp 17, and $gm_{22}$ and $rds_{22}$ are the small-signal transconductance gain and output resistance of transistor 22. To properly isolate the signal current $I_R$ generated in nMOS transistor 22 and resistor $R_{V\text{-}I}$, the signal current $I_R$ must be mirrored to produce an output current $I_{OUT}$ to a load. A pMOS cascode current mirror consisting of pMOS transistor 18–21 is used to perform this task.

The increased output impedance of the voltage-to-current converter of FIG. 3, however, comes at the expense of increased power consumption and reduced linearity. A voltage-to-current converter typically interprets a positive analog voltage signal as a bipolar voltage signal about a reference ground, $V_{ref}=V_{cc}/2$, and converts the bipolar voltage signal into a unipolar current. As a result, the bias current through $R_{V\text{-}I}$ resulting from the reference ground would by $V_{ref}/R_{V\text{-}I}$, and this value can be substantially high to achieve a satisfactory performance. For example, for a transconductance gain of 0.5 mA/V and a $V_{ref}$ of 2.5 V, $R_{V\text{-}I}$ would be about 2 KΩ, resulting in a bias current of 2.5V/2KΩ=1.25 mA through the nMOS 22/$R_{V\text{-}I}$ branch alone.

The second, and more severe limitation is due to the signal $I_R$ having to be mirrored in order to produce the output current $I_{OUT}$. This task is performed by the pMOS cascode current mirror 18–21, but current mirrors, in general, suffer from high non-linearities which must be reduced either by introducing feedback or by increasing their bias current. The architecture of FIG. 3 requires that the cascode current mirror 18–21 remain outside of the feedback loop. As a result, its non-linearities must be reduced by increasing its bias current. The resultant bias current in the combination of the cascode current mirror 18–21 and the nMOS 22/$R_{V\text{-}I}$ branch necessary for achieving sufficient linearity levels would be unsatisfactorily high.

Finally, the necessary current mirror 18–21 also has the adverse effect of reducing the overall output impedance of the voltage-to-current converter.

A more common and suitable circuit topology follows the diagram of FIG. 4 which avoids having any active devices process an output current $I_L$ outside of the feedback loop, and hence exhibits higher linearity levels. $V_{in}$ is shown to enter a summation node 25 feeding into a direct amplifier 27 having a passive negative feedback network 29. The passive negative feedback network 29, which consists of a resistive network, eliminates any non-linearities introduced by the use of active devices, such as transistors, in the feedback path. The gain of the feedback network 29 is therefore established by a resistive network rather than by the size of an individual resistor, resulting in a reduced susceptibility to process variations.

FIG. 5 is an example of a typical circuit following the diagram of FIG. 4. Here, a three stage direct amplifier with overall passive negative feedback is shown. Since AC coupling between gain stages is practically prohibitive in integrated circuits due to excessive real estate requirements, DC and AC signal components cannot be separated in the biasing and optimizing of the circuit. Use of overall feedback results in a higher degree of bias stability and desensitization of individual gain tolerances.

Each amplifier stage consists of a PMOS transistor, 31–33, respectively used as a current source controlled by a bias voltage $V_{bb}$, a non-linear gain element respectively provided by transistors 35–37 and a degenerative feedback resistors $R_1$–$R_3$, respectively. The first stage consists of transistors 31 and 35 and resistor $R_1$ connected sequentially and forming an inverting amplifier between $V_{dd}$ and ground. Input signal $V_{in}$ is applied to NMOS transistor 35. $R_1$ forms resistive degenerative feedback which increases the frequency response of the first stage. The output from the first stage is taken at the drain of transistor 35 and applied to the second stage which consists of transistors 32 and 36 and resistor $R_2$. The second stage functions in much the same way as the first stage and couples its output from the drain of transistor 36 to the third stage which consists of transistors 33 and 37 and resistor $R_3$.

The passive negative feedback network of FIG. 5 consists of resistors $R_1$, $R_3$ and $R_{fb}$. Resistive network $R_1$, $R_3$ and $R_{fb}$ respond to a proportional measure of the output current $I_L$ sensed at the source of transistor 37, convert it into a voltage which includes both AC and DC components, and feed the voltage back to the input at the source of transistor 35, which acts as a summation node. The feedback voltage is thereby dependent on a relationship of the feedback resistors $R_1$, $R_3$ and $R_{fb}$.

However, this circuit topology also presents some disadvantages. In order to obtain sufficient gain, a three gain stage network is necessary, which results in three poles and thus a reduced frequency response and reduced linearity. Due to large tolerances in integrated resistors and MOS transistors, especially in low-cost CMOS digital processes, it is quite complicated and unreliable to simultaneously correctly bias the three-stage amplifier. To stabilize the operating point, i.e. the quiescent point, special techniques like common mode feedback are required which tend to complicate the circuit and reduce its performance. Additionally, since the direct amplifier consists of three cascaded inverting amplifying stages, the output signal $I_L$ is not in phase with the input signal $V_{in}$. Furthermore, the feedback gain achievable with the resistive network of $R_1$, $R_3$ and $R_{fb}$ may not be sufficient for many applications.

Many applications require that a VI converter have a very fine resolution. That is, a VI should be able to convert a relatively large input voltage step into a very small, but accurate current step. For example, to interface an 8-bit current-mode ADC, a gain of 0.5 mA/V may be needed. For a 10-bit ADC, a resolution of 0.25 mA/V is necessary. To achieve this, the transconductance gain, i.e. voltage-to-current conversion gain, of the direct amplifier, 27 in FIG. 4, must be small enough to reduce an input $V_{in}$ of a few volts to an output $I_L$ of a fraction of a milliampere. As a result, the transresistance gain or current-to-voltage gain, of the passive feedback network 29 in FIG. 4 must be very high to convert a measure of the output current, which may be a fraction of a milliampere, into a relatively large feedback voltage to feed into summation node 25. This is especially apparent when one considers that the DC offset and gain accuracy of an ADC must be contained within one least significant bit to avoid offset and gain errors. This means that the precision of the DC characteristics should be on the order of 0.5–1.0 $\mu$A for the 8-bit and 0.25–0.50 $\mu$A for the 10-bit examples given above.

It can be readily demonstrated that the transresistance gain of the feedback network of FIG. 5 is given by $(R_1*R_3)/(R_1+R_3+R_{fb})$. This feedback gain is heavily dependent on R1 and R3, which are also an integral part of the direct amplifier. Therefore, any attempt to increase the transresistance gain is physically limited by practical considerations involving the required biasing conditions of the direct amplifier. As a result, this circuit cannot viably achieve sufficient transresistance feedback gain to obtain the fine tuning necessary for many high-performance applications.

It is an object of the present invention to provide a wide frequency voltage-to-current converter with fine tuning capabilities and a self-compensating scheme. It is another object of the present invention to provide a voltage-to-current converter having a high, stable and predictable transresistance feedback gain equal to a ratio of resistor values and does not introduce non-linearities into the feedback path. It is another object of the present invention that the biasing condition of the direct amplifier of the overall voltage-to-current converter be independent of any adjustment to the transresistance feedback gain network. It is another object of the present invention to provide an integrated voltage-to-current converter with stable DC bias conditions and optimized AC performance.

SUMMARY OF THE INVENTION

These objects have been met in an integrated voltage-to-current converter having an overall active negative feedback network consisting of an active, differential current-to-voltage converter having a gain determined only by a resistive ratio.

The voltage-to-current conversion of the direct amplifier of the present invention preferably consists of a two-stage direct transconductance amplifier. The first stage of the two-stage direct transconductance amplifier is a voltage-to-voltage converter, or voltage amplifier, and the second stage of the two-stage direct transconductance amplifier is a voltage-to-current converter, or transconductance amplifier. The two-stage direct transconductance amplifier has an overall active negative feedback network consisting of a differential current-to-voltage converter which translates only the AC component of a measure of an output current into a feedback voltage.

The voltage-to-voltage converter, that is, the first stage of the two-stage direct transconductance amplifier serves to condition an input voltage signal for use by the second stage of the two-stage direct amplifier. The voltage-to-voltage converter preferably has a high degree of linearity over a wide frequency range, a small gain, a high input impedance so as to not load an input voltage signal and a low output impedance so as to not load the second stage of the two-stage direct amplifier. The voltage-to-voltage converter of the present invention preferably has local degenerative feedback in the form of a first pull-down resistor and may also have a pull-up bias resistor or a current source. If a current source is used, then it preferably receives a bias signal from a first bias tree having a structure identical to the structure of the voltage-to-voltage converter itself.

The transconductance amplifier, that is, the second stage of the two-stage direct amplifier, receives a conditioned voltage signal from the voltage-to-voltage converter of the first stage and converts the conditioned voltage signal into a proportional output current signal. The second stage of the two stage direct amplifier preferably has local degenerative feedback by use of a second pull-down resistor. The transconductance amplifier of the second stage preferably has a simple cascode or regulated cascode current source which receives a bias signal from a second bias tree having a structure identical to the transconductance amplifier itself.

The differential current-to-voltage converter forming the overall active negative feedback network of the present invention consists of a closed-loop differential amplifier, or Diff Amp, having local resistive feedback. The Diff Amp of the present invention has a negative input terminal, a positive input terminal and an output terminal. An input resistor is coupled between the negative input terminal of the Diff Amp and the second pull-down resistor forming the local degenerative feedback network of the second stage of the two-stage direct amplifier. In this way the resistor of the second stage, or transconductance amplifier, serves as a current sense element for the differential current-to-voltage converter of the overall active negative feedback. A local feedback resistor is coupled between the output terminal and negative input terminal of the Diff Amp. The positive input terminal of the Diff Amp receives a signal substantially similar to the DC component of the voltage across the pull-down resistor of the second stage, or transconductance, amplifier.

As explained before, the second bias tree providing the control bias signal for the transconductance amplifier has a structure identical to the transconductance amplifier. In essence, the second bias tree is a copy of the transconductance amplifier. The transconductance amplifier receives a conditioned voltage signal having a DC and an AC component and therefore produces an output current having an AC and an DC component, but the second bias tree receives only a DC reference voltage. Since the second bias tree is identical to the transconductance amplifier, it produces a DC signal substantially similar to the DC signal of the transconductance amplifier. The DC signal from the second bias tree is fed into the positive input terminal of the Diff Amp. In essence the second bias tree, which has a resistor equal to the degenerative feedback resistor of the transconductance amplifier, serves as a bias signal generator for the Diff Amp. Since both the positive and negative inputs of the Diff Amp receive substantially the same DC voltage, the Diff Amp rejects the DC component of the output current and responds only to the AC component of the output current. In this manner, only the AC component of the output current is converted into an amplified feedback voltage.

BEST MODE FOR CARRYING OUT THE INVENTION

Figure 1:
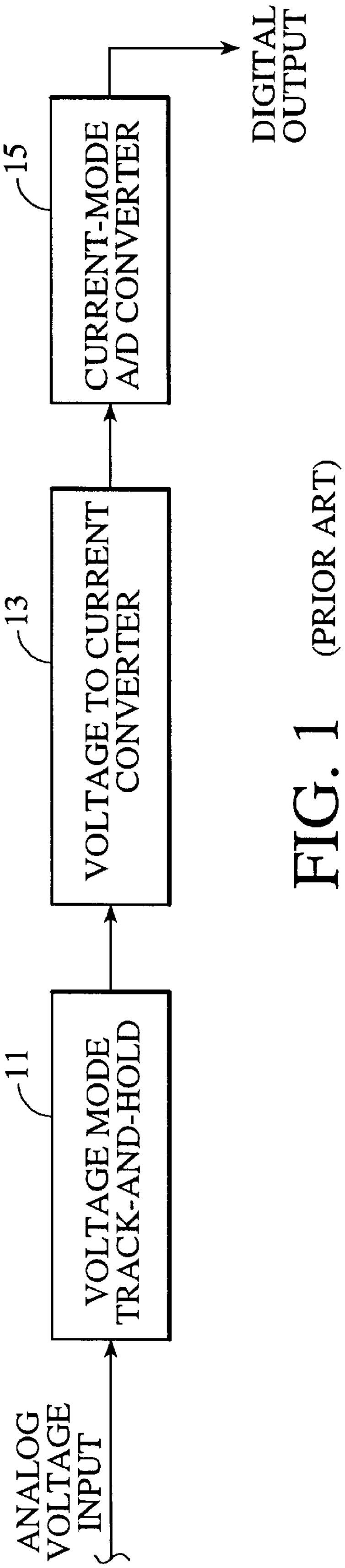
FIG. 1 (PRIOR ART)
FIG. 1 is a block diagram of prior art analog-to-digital converter using a voltage-to-current converter.
Figure 2:
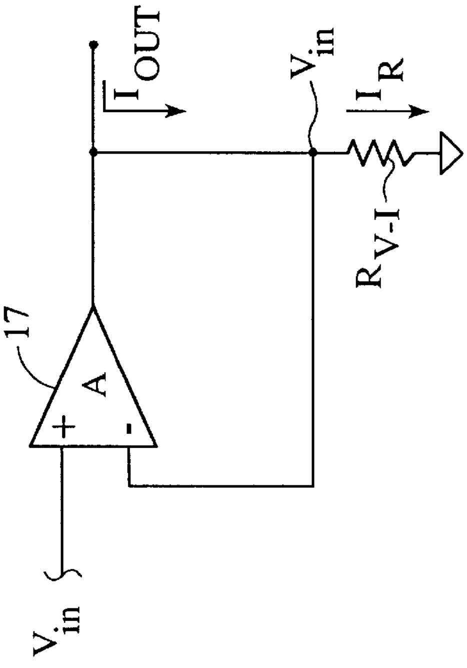
FIG. 2 (PRIOR ART)
FIG. 2 is a prior art voltage-to-current converter.
Figure 3:
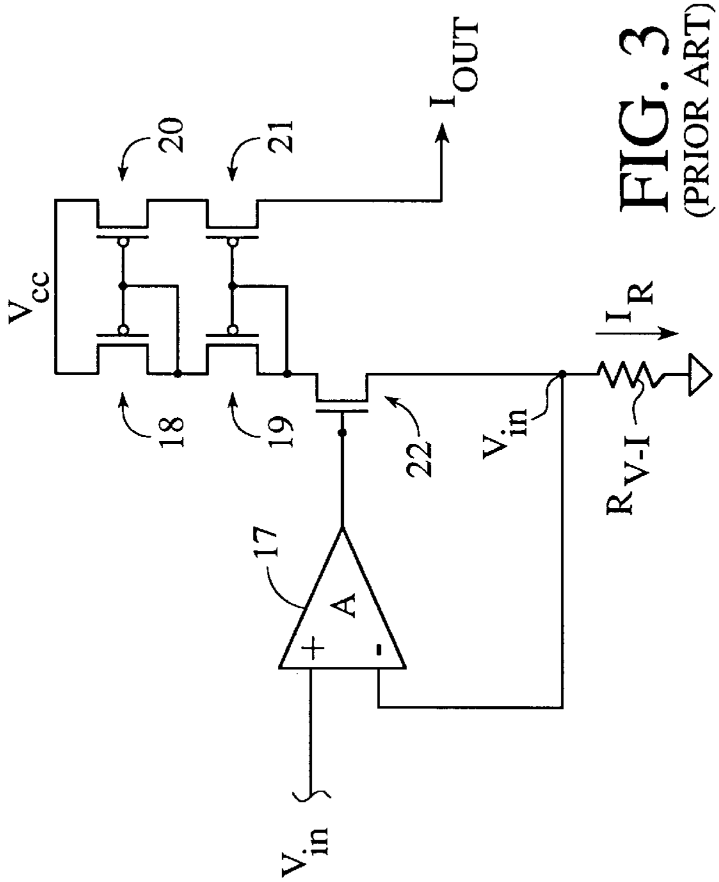
FIG. 3 (PRIOR ART)
FIG. 3 is a prior art MOS implementation of the voltage-to-current converter shown in FIG. 2.
Figure 4:
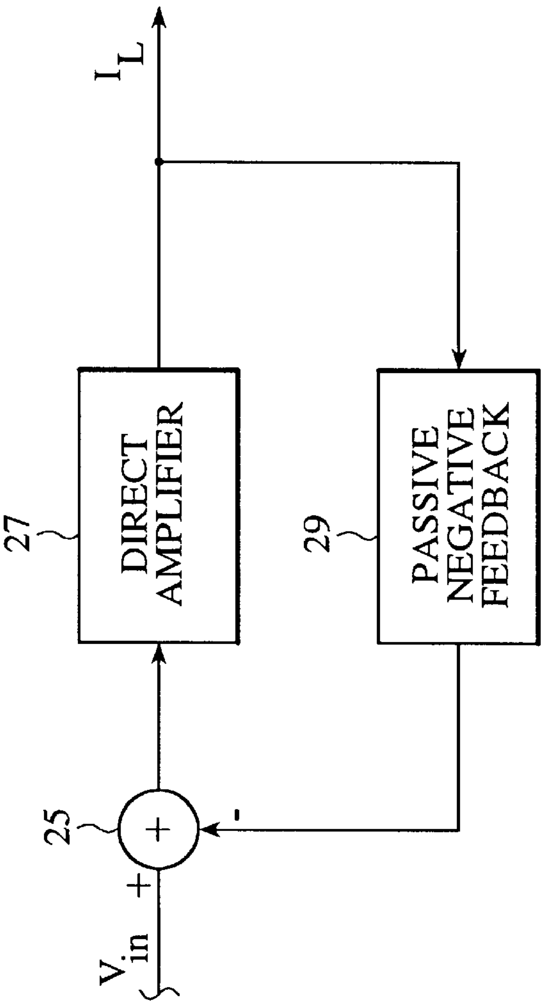
FIG. 4 (PRIOR ART)
FIG. 4 is block diagram of a prior art voltage-to-current converter.
Figure 5:
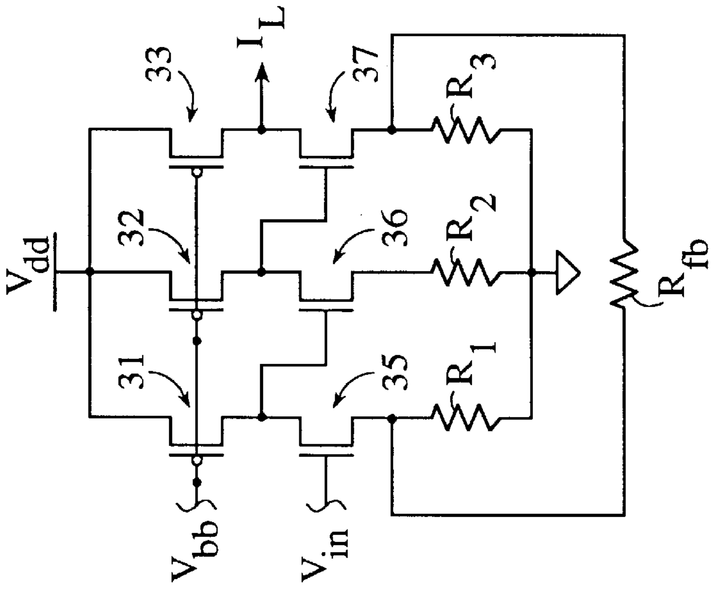
FIG. 5 (PRIOR ART)
FIG. 5 is a prior art MOS voltage-to-current converter in accord with FIG. 4.
Figure 6:
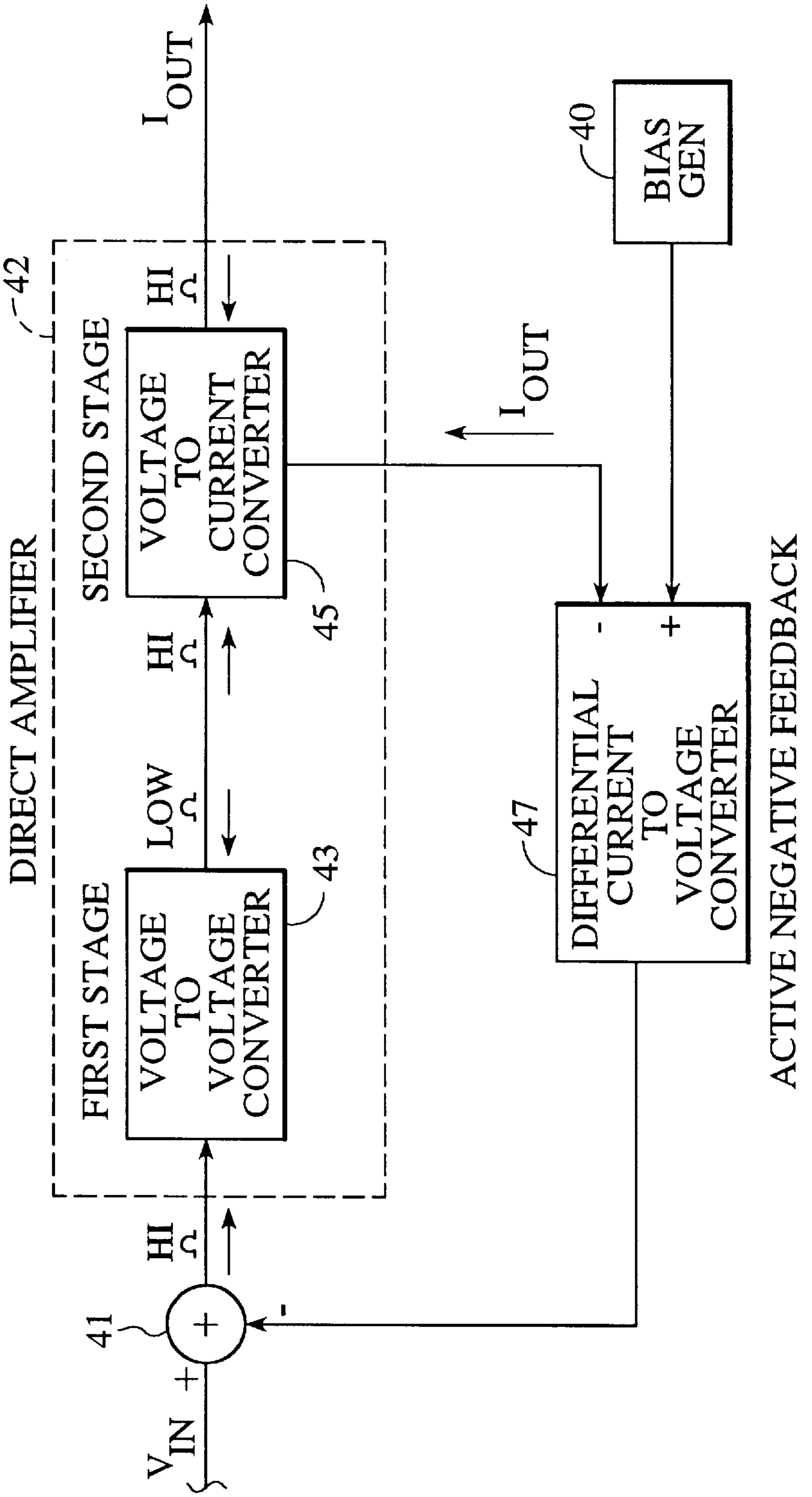
FIG. 6 is a block diagram of a voltage-to-current converter in accord with the present invention.

With reference to FIG. 6, a representative view of the present invention is shown. The present invention includes a direct amplifier 42. As is known in the art, a direct amplifier has an input, output and one or more gain stages therebetween, but no feedback from the output to the input. Preferably, the direct amplifier of the present invention has two stages 43 and 45. The first stage 43 is a voltage-to-voltage converter, i.e. voltage amplifier, having a high input impedance and a low output impedance. The first stage 43 feeds into the second stage 45, a voltage-to-current converter, i.e. transconductance amplifier, having a high input impedance and a high output impedance. The second stage voltage-to-current converter 45 outputs a current $I_{OUT}$ which is sensed by an active negative feedback, differential current-to-voltage converter 47 having a gain preferably much larger than unity. The differential current-to-voltage converter 47 also has a second input receiving a bias signal from a bias generator 40. The bias signal from the bias generator 40 is typically a DC voltage signal, but it can be a DC current signal.

Bias generator 40 preferably produces a bias signal equal to a measure, in voltage or current, of the DC component of $I_{OUT}$ such that in the process of rejecting the common mode signal of both its inputs, the differential current-to-voltage converter 47 outputs an amplified AC voltage signal proportional only to the AC component of $I_{OUT}$. In this manner, the feedback network is less influenced by DC bias, temperature or process drifts. The output from the differential current-to-voltage converter 47 is subtracted from an input signal $V_{in}$ at summation node 41 and thereby forms an overall feedback network encompassing both stages, 43 and 45, of the direct amplifier 42.

Figure 7:
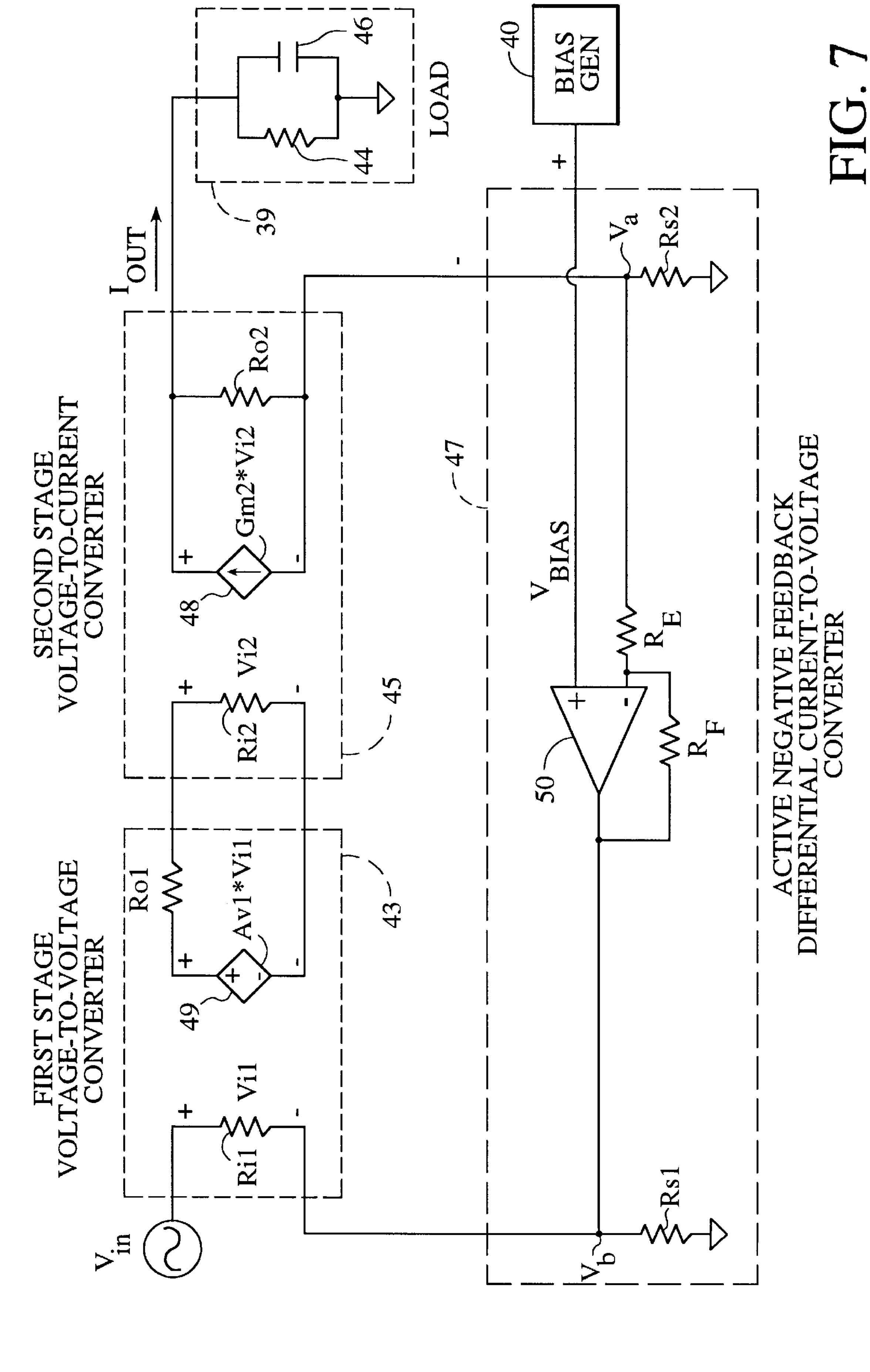
FIG. 7 is a block diagram of a voltage-to-current converter in accord with a first embodiment of the present invention.

With reference to FIG. 7, an idealized representation of the present invention is shown in circuit form. Again, the two-stage direct amplifier is shown to be composed of a voltage-to-voltage converter, or voltage amplifier, 43 followed by a voltage-to-current converter, or transconductance amplifier 45, with an active, negative feedback consisting of differential current-to-voltage converter network 47. The differential current-to-voltage converter feedback network 47 consists of resistor Rs2, resistor Rs1, and a closed-loop differential amplifier 50 which includes input resistor $R_E$ and local feedback resistor $R_F$.

The input signal $V_{in}$ is applied to the voltage amplifier 43 which provides a high input impedance Ri1 to minimize any loading effects on $V_{in}$ and thereby improve the linearity of the overall voltage-to-current converter of FIG. 7. The voltage difference between $V_{in}$ and the voltage across Rs1 at node Vb forms a voltage drop Vi1 across Ri1 which is reflected by dependent voltage source 49 as an output voltage equal to Vi1 amplified by a transresistance gain, Av1.

The output of dependent voltage source 49 is applied through a low output impedance Ro1 to a high input impedance Ri2 of the transconductance amplifier 45. The voltage drop Vi2 across Ri2 is reflected as a current by voltage dependent current source 48 which has a transconductance gain of Gm2. Voltage dependent current source 48 is connected in parallel with an output impedance Ro2 made to be high to improve the linearity of the overall circuit of FIG. 7. The output current $I_{OUT}$ leaving the transconductance amplifier 45 is applied to a load 39 symbolized by the parallel combination of a resistor 44 and a capacitor 46.

The output current $I_{OUT}$ also flows through Rs2 and is sensed at node Va. Node Va is coupled through $R_E$ to the inverting, i.e. negative, input terminal of Diff Amp 50. The output of Diff Amp 50 is fed back through local feedback resistor $R_F$ to the same inverting input and thereby forms a local closed-loop negative feedback network. The non-inverting, i.e. positive, input terminal of Diff Amp 50 is coupled to a reference voltage, $V_{BIAS}$.

As explained above $V_{BIAS}$ is produced by bias generator 40 and is preferably equal to the DC component of the voltage at node Va. In this manner, Diff Amp 50 rejects all common mode and drift voltages while it converts and amplifies only the AC component of the output current $I_{OUT}$. Thus the DC bias conditions of the direct amplifier may be optimized separate from the AC feedback circuit. This allows for the DC operating point of the VI converter of the present invention to auspiciously be made to match the potential of the load 39 without consideration to any ill effects to the feedback gain. It is further noted that this operating point should be stable as much as possible in temperature and with process variations. More importantly, the gain of the closed-loop Diff Amp 50 may be adjusted without affecting the direct amplifier.

The local closed loop differential amplifier 50 has a constant gain of $-R_F/R_E$ over a given operating frequency range. Therefore, the sensed voltage at Va is amplified by a gain of $-R_F/R_E$ and applied across Rs1 at node Vb. The combination of the $-R_F/R_E$ gain from local closed-loop Diff Amp 50 along with Rs1 and Rs2 form the current-to-voltage active negative feedback network 47. The feedback gain magnitude β of the negative feedback network 47 is $Rs2*R_F/R_E$. Assuming that the open-loop gain of the overall voltage-to-current converter, including the two-stage direct amplifier, is much greater than unity, then the overall gain of the entire overall voltage-to-current converter is simply the reciprocal of β, or $R_E/(R_F*Rs2)$. Since $R_F$ and $R_E$ are part of only the closed-loop Diff Amp 50, the gain of the active feedback network 47 and the overall voltage-to-current converter can be adjusted without affecting the biasing conditions of the two-stage direct amplifier 43–45.

Figure 8:
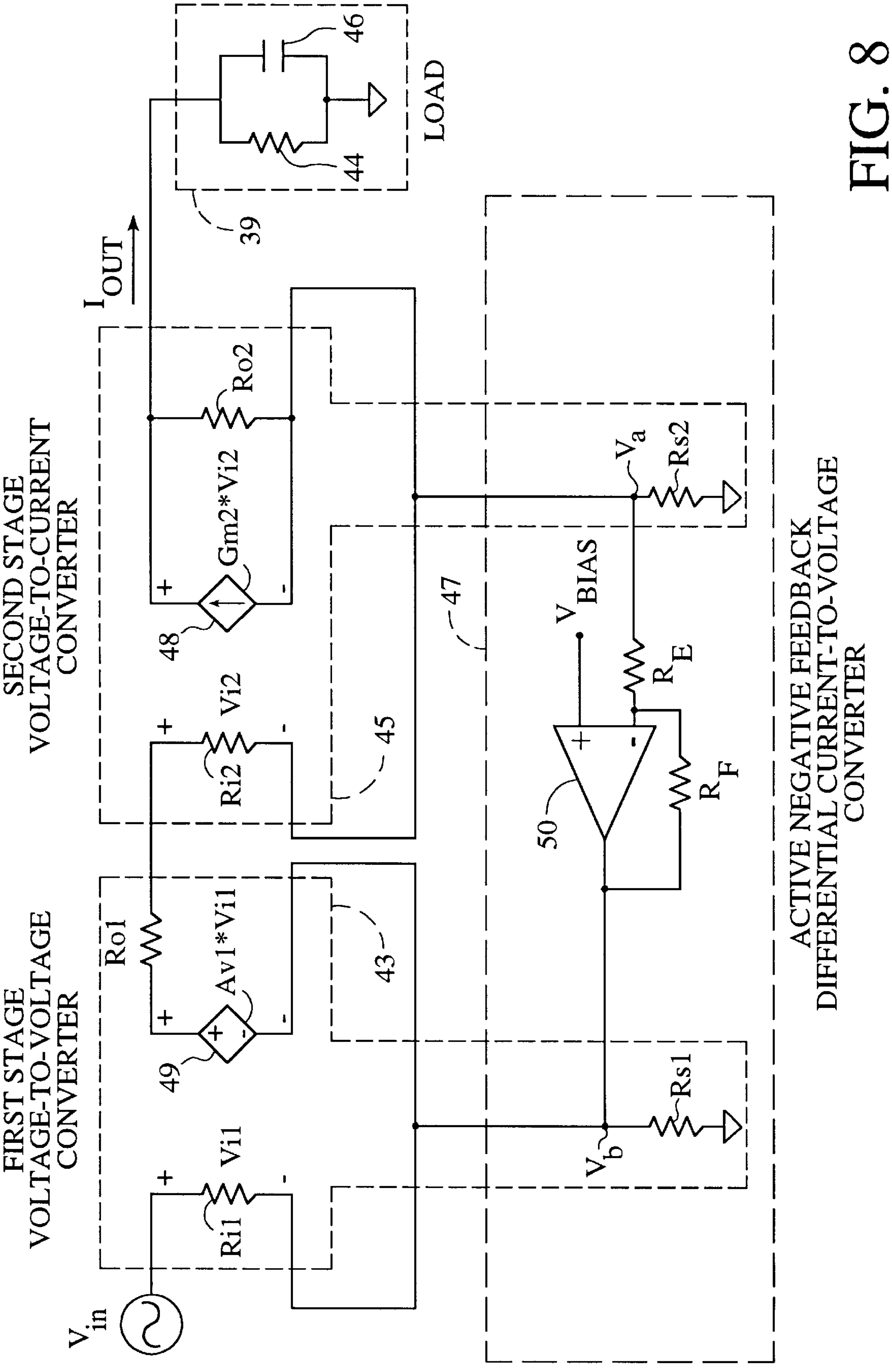
FIG. 8 is a block diagram of a voltage-to-current converter in accord with a second embodiment of the present invention.

FIG. 8 shows a second representation of a preferred embodiment of the present invention. The configuration of FIG. 8 is substantially the same as the configuration of FIG. 7 and the overall feedback network 47 is the same as in FIG. 7, but the first and second stages, 43 and 45 respectively, of the two-stage direct amplifier are connected to form local, negative degenerative feedback networks. Node Vb is coupled to the reference ground of the output of the first stage 43, the voltage amplifier, such that the output current of stage 43 is sampled through RS1 and fed back as a voltage to the reference ground of the input of the same stage 43. In other words, Rs1 behaves as a degenerative resistor for voltage amplifier 43.

Similarly, node Va is coupled to the reference ground of the input of the second stage 45, the transconductance amplifier, such that the output current $I_{OUT}$ sampled through Rs2 is fed back as a voltage to the reference ground of the input of the second stage 45. Thus Rs2 behaves as a degenerative resistor for transconductance amplifier 45.

Although Rs1 and Rs2 also form a part of the overall active negative feedback network 47 of the two-stage direct amplifier, the feedback gain of the overall feedback network 47 may still be set arbitrarily without affecting the biasing condition of either first stage 43 or second stage 45. As explained above, this is because the gain of the overall feedback network 47 may be adjusted by changing the local feedback network belonging to Diff Amp 50 and including $R_F$ and $R_E$. Since the local feedback network of Diff Amp 50 consists of a separate set of resistors $R_F$ and $R_E$, they may be adjusted without affecting Rs1 or Rs2 and thereby not affect the two-stage direct amplifier.

The voltage-to-current converter of the present invention may be optimized for a variety of criteria by proper selection of the first stage 43 and second stage 45 of the two-stage direct amplifier. In other words, there are various methods of implementing the voltage amplifier 43 of the first stage and the transconductance amplifier 45 of the second stage. FIGS. 9 through 13 show by way of example some possible implementations. Those skilled in the art will recognize that there are additional methods of implementing the VI of the present invention, and the present invention is therefore not limited to the example circuits shown in FIGS. 9 through 13.

Figure 9:
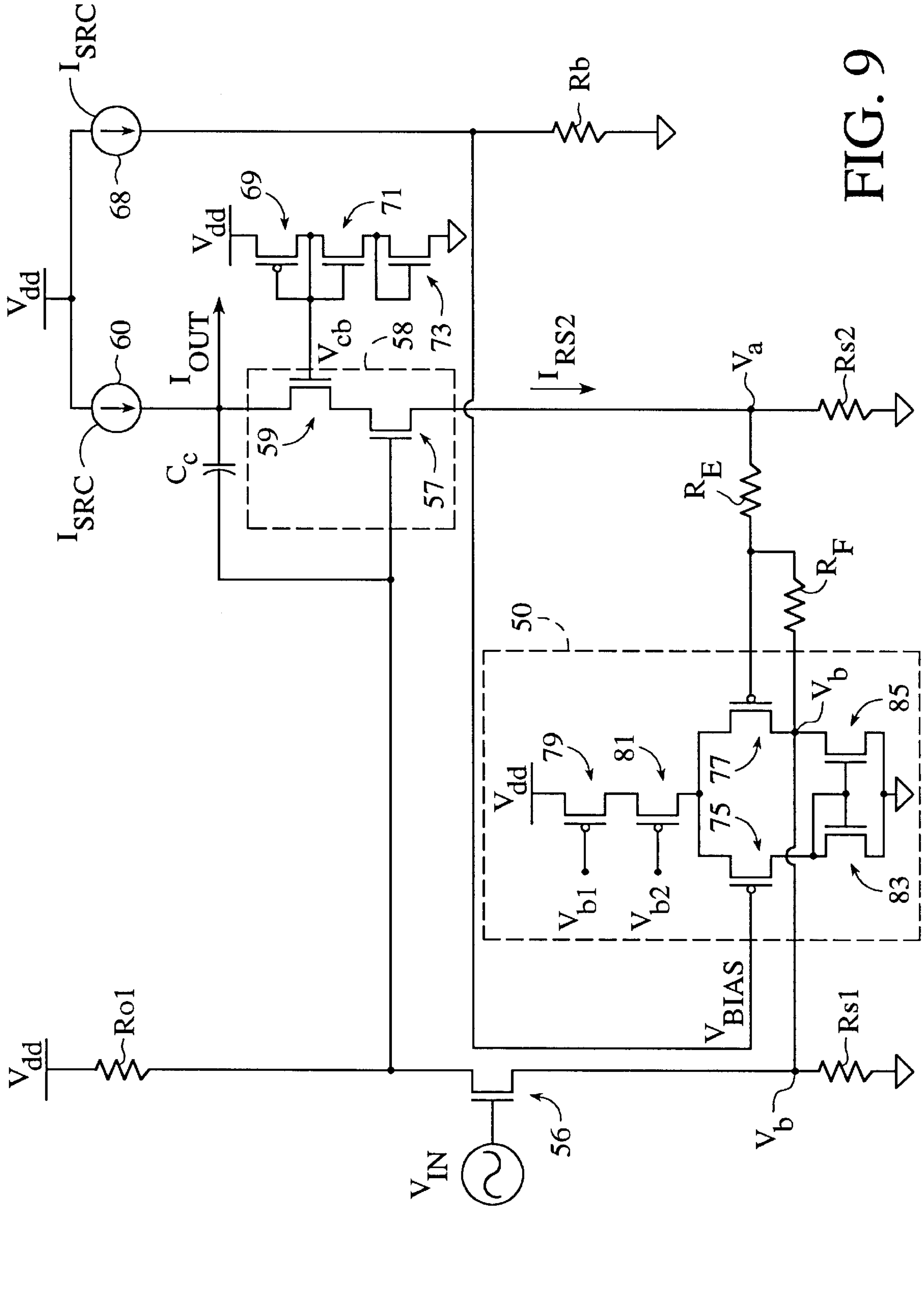
FIG. 9 is a basic MOS implementation of a voltage-to-current converter in accord with the present invention.

A transistor level solution of the circuit of FIG. 8 is shown in FIG. 9. The voltage amplifier forming the first stage 43 of FIG. 8 is shown in FIG. 9 to consist of output, pull-up bias resistor Ro1, NMOS transistor 56 and regenerative feedback resistor Rs1. As is known in the art, this configuration of an inverting voltage amplifier has a high input impedance, low output impedance and a wide frequency response. The low output impedance of this inverting amplifier improves the linearity of the overall voltage-to-current converter of FIG. 9. Input signal $V_{IN}$ is applied to the control gate of NMOS transistor 56 causing an inverted voltage output at the drain of NMOS transistor 56.

The inverted output of NMOS transistor 56 is applied to the control gate of NMOS transistor 57. NMOS transistor 57 is shown coupled to NMOS transistor 59 as a simple cascode 58 which forms the input stage to the transconductance amplifier of the second stage 45, as shown in FIG. 8. Cascode circuit 58 along with constant current source $I_{SRC}$, 60, and cascode bias voltage Vcb form a cascode transconductance gain stage which has the advantage of reducing the effective capacitance appearing at the input for high frequency operation, while at the same time providing a much higher output impedance and transconductance gain than available if a single transistor is used as the input stage. Cascode bias voltage Vcb is provided by a supply-independent CMOS bias circuit source consisting of transistors 69, 71, and 73. Additionally, to further improve its linearity and frequency response, a feedback capacitor Cc is coupled between the input of the transconductance amplifier at the gate of NMOS transistor 57 to the output of the transconductance amplifier at the drain of NMOS transistor 59.

The transconductance amplifier of FIG. 9 forming the second stage 45 of FIG. 8 is an inverting amplifier, but since it receives an inverted signal from the drain of transistor 56, the first stage of FIG. 9, the output current $I_{OUT}$ is non-inverted and in phase with the input signal $V_{IN}$.

Current $I_{OUT}$ consists of a DC component supplied by constant current source $I_{SRC}$ 60 less an AC component introduced by AC variation at the control gate of NMOS transistor 57. A current $I_{RS2}$ is $I_{SRC}$ 60 less $I_{OUT}$ and is therefore proportional to $I_{OUT}$. $I_{RS2}$ leaves the cascode circuit 58 at the source of transistor 57 and passes through sensing resistor RS2, coupled between the source of NMOS transistor 57 and ground. Current $I_{RS2}$ has a DC component proportional to the DC component of $I_{OUT}$ and an AC component proportional to the inverse of the AC component of $I_{OUT}$. Thus, $I_{RS2}$ is a gauge current indicating a measure of $I_{OUT}$. Therefore, as current $I_{RS2}$ passes through sensing resistor Rs2, a voltage Va proportional to $I_{OUT}$ is generated across Rs2. As explained above, the voltage Va is applied through a resistor $R_E$ to the inverting input of a Diff Amp 50 producing an amplified difference voltage at node Vb.

In FIG. 9, an exemplary transistor level solution of Diff Amp 50 is shown. Many transistor level implementations of Diff Amps are known. The selected transistor level implementation of Diff Amp 50 is not critical to the invention. Diff amp 50 has a cascode current source consisting of PMOS transistors 79 and 81 controlled by reference voltages Vb1 and Vb2, respectively. At the drain of PMOS transistor 81, the current path is divided into two differential paths controlled by PMOS transistors 75 and 77. The drains of transistors 75 and 77 are in turn coupled to ground through respective branches of a current mirror made up of NMOS transistors 83 and 85.

The gate of PMOS transistor 77 constitutes the inverting input of Diff Amp 50 and is coupled to input resistor $R_E$. Similarly, the drain of PMOS transistor 77 constitutes the output of Diff Amp 50 and is coupled through local feedback resistor $R_F$ to the input at its gate.

The gate of PMOS transistor 75 constitutes the non-inverting input of Diff Amp 50 and is coupled to a reference bias voltage $V_{BIAS}$. As explained above, $V_{BIAS}$ preferably has a value representative of the DC component of $I_{OUT}$ such that Diff Amp 50 rejects the DC component of $I_{OUT}$ and amplifies only the voltage representation of the AC component of $I_{OUT}$. In this case $V_{BIAS}$ therefore preferably equals the DC component of the voltage at node Va.

To accomplish this, $V_{BIAS}$ is tapped off a bias tree very similar to the transconductance amplifier, but which does not introduce any AC variations. $V_{BIAS}$ is generated by a bias sensing resistor Rb, equal to sensing resistor Rs2, and receiving a bias DC current from a second constant current source $I_{SRC}$ 68 equal to the constant current source $I_{SRC}$ 60 of the cascode transconductance gain stage discussed above. This generates a voltage drop $V_{BIAS}$ across bias resistor Rb equal to the DC component of the voltage at Va.

To finish the overall differential active feedback network 47 of FIG. 8, in FIG. 9 the output of Diff Amp 50 at node Vb is applied to the source of NMOS transistor 56 and degenerative resistor RS1 of the voltage amplifier, the first stage of the two-stage direct amplifier.

Figure 10:
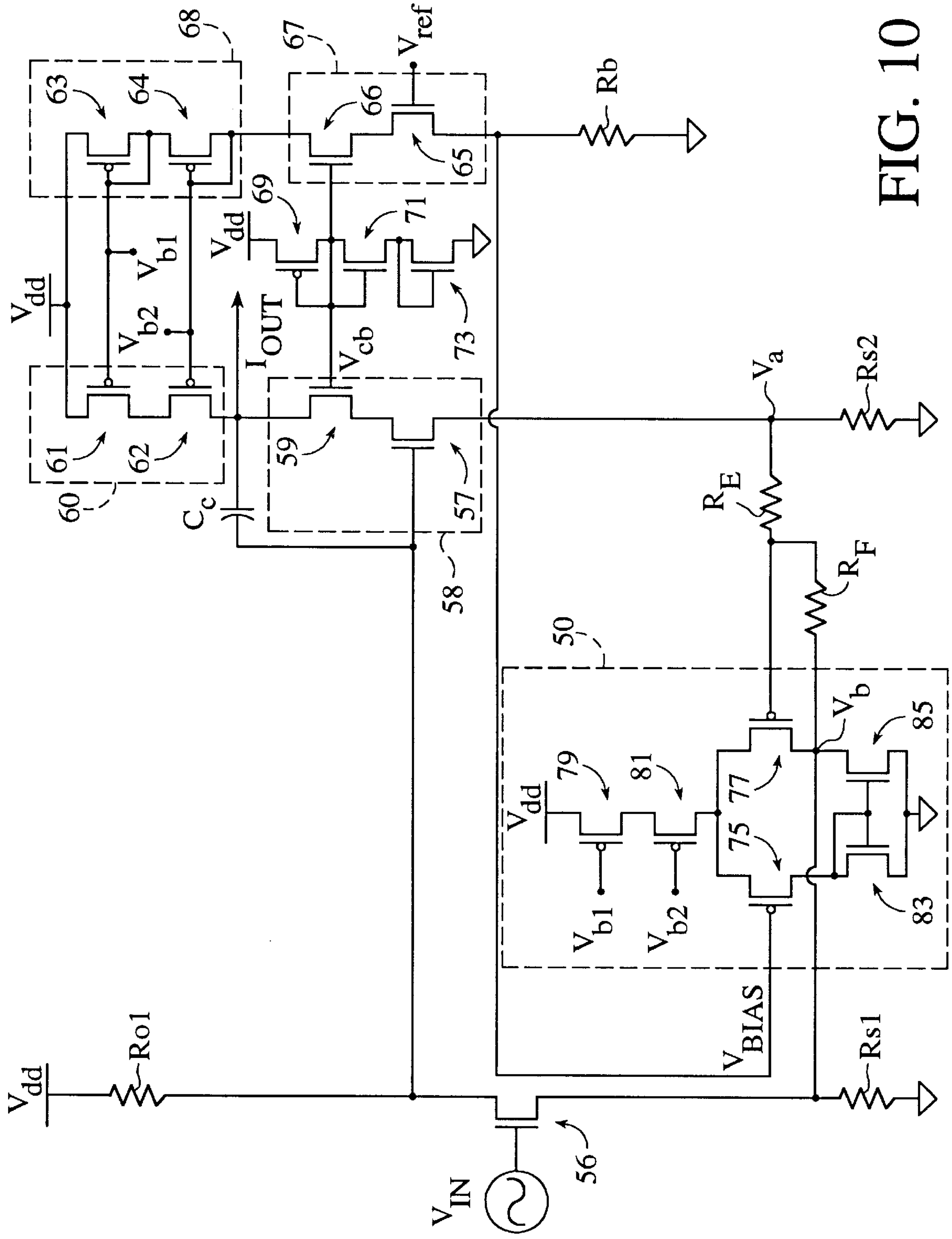
FIG. 10 is a more detailed description of the circuit shown in FIG. 9, and showing the use of a simple cascode current source.

In FIG. 10, the $V_{BIAS}$ generating branch and constant current sources 60 and 68 of FIG. 9 are further defined. Circuit components in FIG. 10 having similar functions and connections as in FIG. 9 are identified by reference characters similar to those of FIG. 9 and are explained above.

To ensure that constant current sources $I_{SRC}$ 60 and 68 of FIG. 9 have similar current values, they are implemented as a current mirror in FIG. 10, more specifically a cascode current source. A cascode current source produces a low loading effect at its output. PMOS transistors 61 and 62 form a cascode current source 60 and generate $I_{SRC}$ in response to a bias cascode current source 68 consisting of diode connected PMOS transistors 63 and 64. Because the control gates of matching transistor pairs 61/63 and 62/64 are coupled together, the current in bias cascode current source 68 is mirrored in cascode current source 60.

The current of the cascode current sources 60 and 68 are set by a third cascode circuit 67 consisting of NMOS transistors 66 and 65. Cascode circuit 67 is coupled along a single current path between bias cascode current source 68 and bias sensing resistor Rb. Thus, the current $I_{SRC}$ in bias cascode current source 68, and thereby current in cascode current source 60, is determined by cascode circuit 67. NMOS transistor 66 is matched to NMOS transistor 59 and NMOS transistor 65 is matched to transistor 57. Further, NMOS transistor 66 shares the same reference cascode bias voltage Vcb as NMOS transistor 59. The bias DC current $I_{SRC}$ of cascode current sources 60 and 68 are set by a DC reference voltage $V_{ref}$ applied to the gate of input transistor 65. Thus, the bias tree consisting of cascode circuits 68 and 67 and resistor Rb has a structure identical to the structure of the transconductance amplifier consisting of cascode circuits 60 and 58 and resistor Rs2. In this way, the DC loading and voltage conditions at the inverting and non-inverting inputs of Diff Amp 50 are maintained similar through process, temperature and drift variations. FIG. 10 also shows that the bias voltages Vb1 and Vb2 controlling PMOS transistors 79 and 81 of Diff Amp 50 are generated at the control gate of PMOS transistors 63 and 64.

Figure 11:
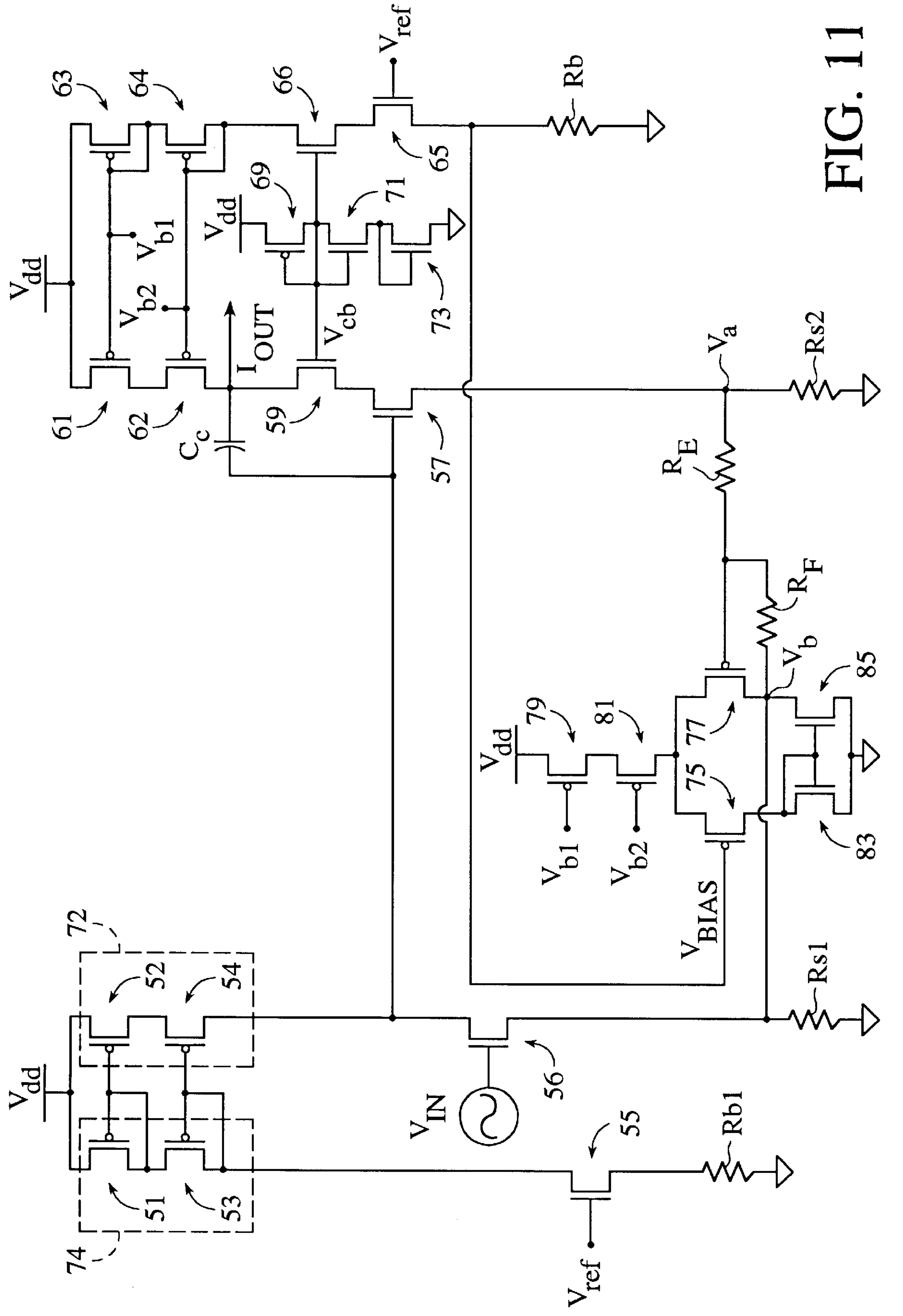
FIG. 11 is an alternative variation on the circuit shown in FIG. 10.

With reference to FIG. 11, a second embodiment of the present invention is shown. Circuit components in FIG. 11 having similar functions and connections as in FIG. 10 are identified by reference characters similar to those of FIG. 10 and are explained above. The output pull up resistor Ro1 of the voltage amplifier in FIG. 10 is replaced in FIG. 11 by a simple cascode current source 72 controlled by a second bias tree having a structure identical to the structure of the voltage amplifier itself. Use of a current source in the voltage amplifier, the first stage of the two-stage direct amplifier, results in a high output impedance for the overall voltage-to-current converter of FIG. 11, but also experiences reduced linearity, i.e. lower performance. The DC current from current source 72 is controlled by bias tree cascode current source 74 and is set by $V_{ref}$ applied to the control gate of NMOS transistor 55 and by a second bias resistor Rb1. Transistors 52, 54 and 56 and resistor Rs1 match transistors 51, 53 and 55 and resistor Rb1, respectively. Transistor 56 is supplied by a DC current from cascode circuit 72 which mirrors the DC current in cascode circuit 74.

Figure 12:
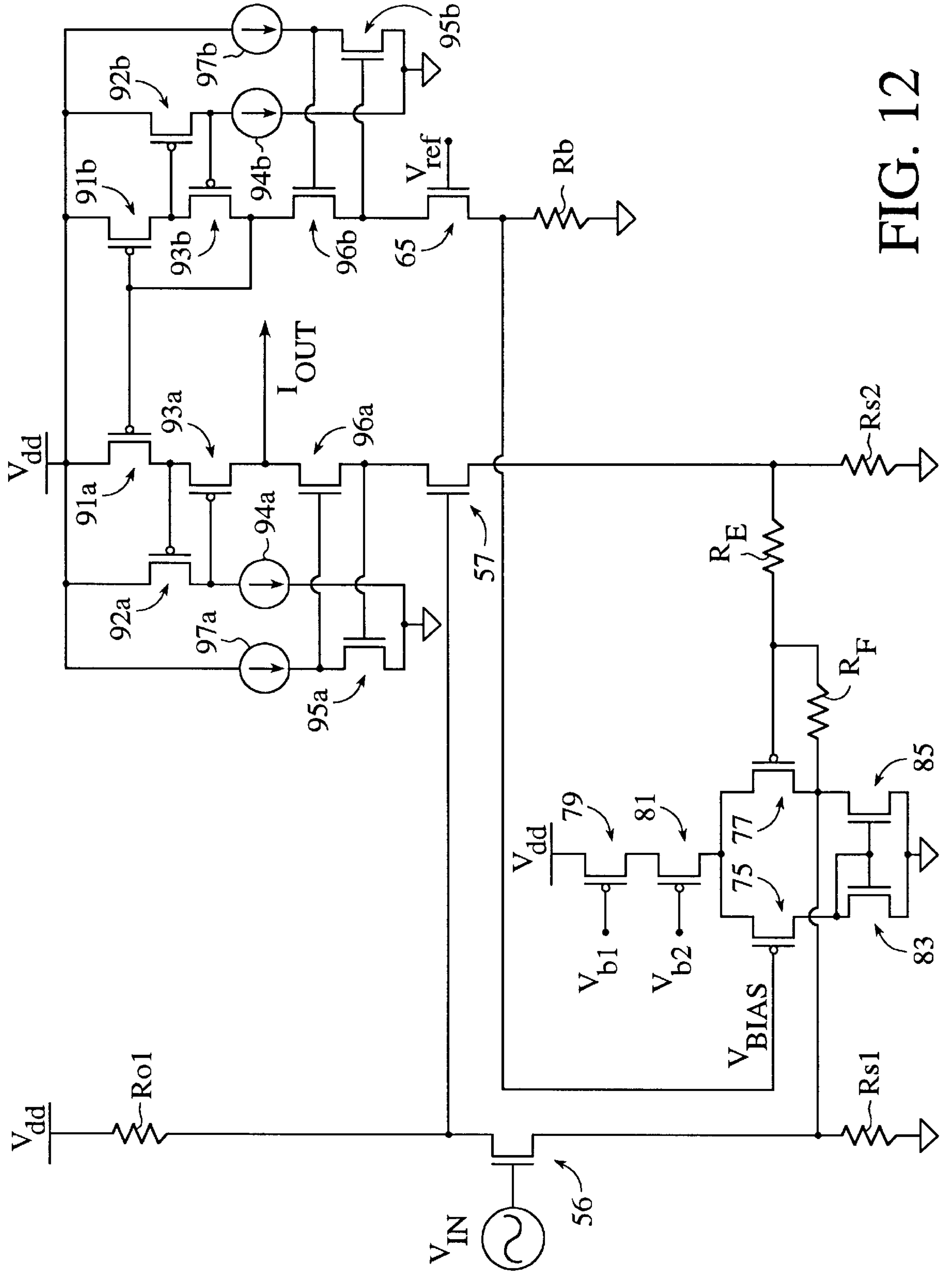
FIG. 12 is an alternative variation on the circuit shown in FIG. 9 and showing the use of a regulated cascode current source.

With reference to FIG. 12, a third embodiment of the present invention is shown. All components having similar functions and connections as in FIG. 10 are identified by reference characters similar to those of FIG. 10 and are explained above. In FIG. 12, an output pull up resistor Ro1 is once again used in the first, i.e. the voltage amplifier, stage of the two-stage direct amplifier. As explained above, this results in better linearity, but a lower output impedance. To improve the output impedance of the overall voltage-to-current converter of FIG. 12, a regulated cascode transconductance amplifier is used in the second stage, i.e. the transconductance amplifier, of the two-stage direct amplifier.

The regulated cascode transconductance amplifier, 91*a*–97*a*, is not self-biased. Rather, like in the case of the simple cascode transconductance amplifiers of FIGS. 10 and 11, the regulated cascode transconductance amplifier 91*a*–97*a* is biased by a bias tree 91*b*–97*b* having a structure identical the gain stage 91*a*–97*a* of the regulated cascode transconductance amplifier. The only difference being that in order for the gain stage 91*a*–97*a* to mirror the current in bias tree 91*a*–97*b,* the device which couples together the two branches of the regulated cascode transconductance amplifier, in this case PMOS transistor 91*b*, is necessarily diode connected. By using a bias tree having the same circuit structure as the gain stage, DC bias and temperature variations as well as process drifts may be effectively canceled out.

The regulated cascode transconductance amplifier of FIG. 12 provides a higher input impedance than the simple cascode transconductance amplifier of FIG. 10, and thereby compensates for the lower output impedance of the first stage of FIG. 12, i.e. the voltage amplifier. The regulated cascode transconductance amplifier further has a higher transconductance gain, higher output impedance and wider frequency range. Additionally, the regulated cascode transconductance amplifier has a larger voltage swing allowing a better adjustment to the voltage of a load.

Transistors 91*a*–93*a* and current source 94*a* form a regulated cascode current source of the gain stage 91*a*–97*a* which mirrors the current in the regulated cascode current source 91*b*–94*b* of the bias tree 91*b*–97*b*. The two regulated current sources 91*a*–94*a* and 91*b*–94*b* form a current mirror due to a common connection between the control gates of PMOS transistors 91*a* and 91*b*. Due to PMOS transistor 91*b* being diode connected, the DC current of the regulated cascode bias tree is established by a reference voltage $V_{ref}$ applied to the control gate of NMOS transistor 65.

The input stage of both the gain stage 91*a*–97*a* and the bias tree 91*b*–97*b* also consist of a regulated cascode circuit. The regulated cascode input stage of the gain stage 91*a*–97*a* consists of NMOS transistors 57, 95*a* and 96*a* along with current source 97*a*. Current source 97*a* and NMOS transistor 95*a* together form an amplifier which in turn forms a feedback loop with NMOS transistor 96*a* used as a source follower. Thus voltage at the drain of NMOS transistor 57 is self-regulated resulting in the improved performance features of the cascode transconductance amplifier explained above. The input stage of the bias tree consists of NMOS transistors 65, 95*b* and 96*b* along with current source 97*b,* and function in much the way same as the input stage of the amplifier stage.

Figure 13:
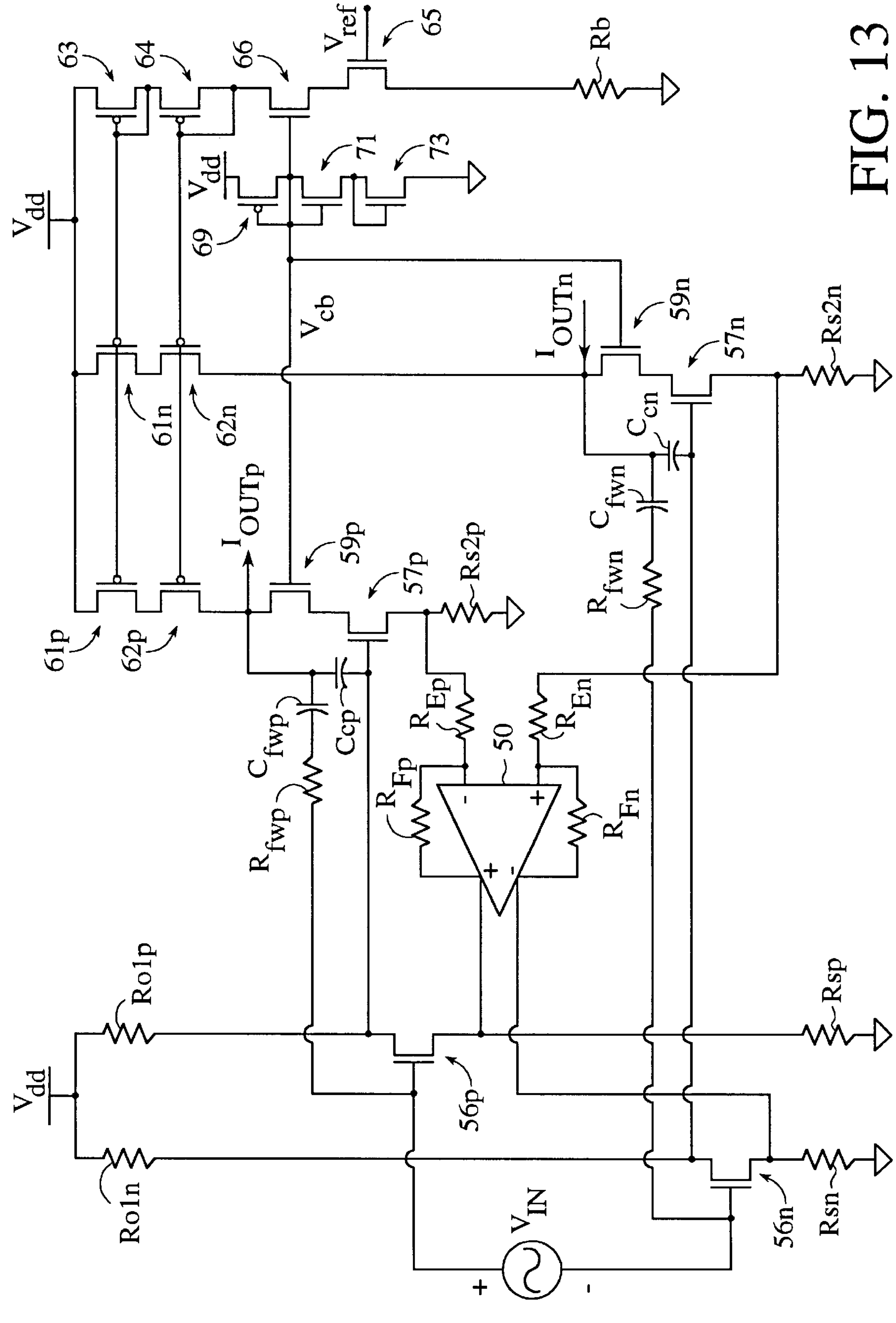
FIG. 13 is a fully dual differential current-to-voltage converter having dual inputs and dual outputs in accord with the present invention.

With reference with FIG. 13, a fully differential voltage-to-current converter in accord with the present invention is shown. The circuit of FIG. 13 functions substantially like the circuit of FIG. 10 except that instead of applying a bias voltage $V_{BIAS}$ to the positive input of Diff Amp 50, the circuit FIG. 13 applies a second feedback input from a second voltage-to-current converter responsive to the negative node of the input signal $V_{IN}$. In other words, the circuit of FIG. 13 functions as two voltage-to-current converters sharing a common Diff Amp 50, a common cascode bias voltage Vcb generator 69–73, and a common bias tree 63–66. Again, the bias tree 63–66 has the same structure as the positive gain stage 57*p*–62*p* and negative gain stage 57*n*–62*n*.

One voltage-to-current converter is responsive to the positive output terminal of $V_{IN}$ and is identified by a subscript "p" at the end of each reference character name and a second voltage-to-current converter is responsive to the negative output terminal of $V_{IN}$ and is identified by a subscript "n" at the end of each reference character name. Circuit components in FIG. 13 having similar functions and connections as in FIG. 10 are identified by reference characters similar to those of FIG. 10 along with the appropriate subscript "p" or "n" and are explained above.

In order for both voltage-to-current converters of FIG. 13 to share a common Diff Amp 50, Diff Amp 50 is shown to have dual outputs. That is, it has a positive output and its complement, a negative output. The positive output of Diff Amp 50 is coupled to the first stage of the direct amplifier responsive to the positive output of $V_{IN}$. That is, the positive output of Diff Amp 50 is applied to the source of NMOS transistor 56*p*. Similarly, the negative output of Diff Amp 50 is coupled to the first stage of the direct amplifier is responsive to the negative output of $V_{IN}$, i.e. the source NMOS transistor 56*n*.

The frequency response of the circuit of FIG. 13 is further enhanced by the use of a series connected feedforward resistor Rfw and feedforward capacitor Cfw coupled between the input and output of the positive and negative voltage-to-current converters, respectively. For example, Rfwp and Cfwp are couple between the input of the positive responding first VI, i.e. the control gate of transistor 56*p,* and the output of the positive responding VI, i.e. the drain of transistor 59*p*. Similarly Rfwn and Cfwn are couple between the input of the negative responding second VI, i.e. the control gate of transistor 56*n,* and the output of the negative responding VI, i.e. the drain of transistor 59*n*. In this manner two output currents $I_{OUT}$p and $I_{OUT}$n are always available with $I_{OUT}$n being 180° out of phase with $I_{OUT}$p.

We claim:

1. A voltage-to-current converter with a feedback network comprising:

a direct amplifier having an input voltage node, a reference voltage node and an output node, said direct amplifier being effective for generating an output current on said output node, said output current being proportional to a voltage difference between said input voltage node and said reference voltage node, said output current having a DC output current component and an AC output current component;

a current-to-voltage converter responsive to said output current and being effective for generating a feedback voltage signal proportional only to said AC output current component, said feedback voltage signal being coupled to said reference voltage node of said direct amplifier; and means for generating a bias signal proportional to said DC output current component, and said current-to-voltage converter further having a first and a second differential input, said first differential input being coupled to receive said bias signal, said current-to-voltage converter including a differential amplifier having a local feedback network and having a local gain magnitude independent of said direct amplifier, said differential amplifier having an output lead coupled to said reference voltage node and having a first and second input lead responsive to said first and second differential inputs, respectively.

2. The voltage-to-current converter of claim 1 wherein said current-to-voltage converter has a feedback gain magnitude other than unity.

3. The voltage-to-current converter of claim 1 wherein said current-to-voltage converter has a feedback gain magnitude independent of said direct amplifier.

4. The voltage-to-current converter of claim 3 wherein said gain magnitude of said current-to-voltage converter is substantially constant for a given frequency range of operation.

5. The voltage-to-current converter of claim 1 wherein said bias signal has a magnitude sufficient for said voltage-to-current converter to cancel said DC output current component.

6. A voltage-to-current converter with a feedback network comprising:

a direct amplifier having an input voltage node, a reference voltage node and an output node, said direct amplifier being effective for generating an output current on said output node, said output current being proportional to a voltage difference between said input voltage node and said reference voltage node, said output current having a DC output current component and an AC output current component, a current-to-voltage converter responsive to said output current and being effective for generating a feedback voltage signal proportional only to said AC output current component, said feedback voltage signal being coupled to said reference voltage node of said direct amplifier, and means for generating a DC bias signal and said direct amplifier further being effective for generating a gauge current proportional to said output current, said gauge current having a DC gauge component proportional to said DC output current component and an AC gauge component proportional to said AC output current component, said DC bias signal being proportional to said DC gauge component, said current-to-voltage converter further including a first differential input lead receiving said DC bias signal, a second differential input lead receiving said gauge current, and an output feedback lead producing said feedback voltage signal.

7. The voltage-to-current converter of claim 6 wherein said current-to-voltage converter includes a closed-loop voltage amplifier, a first sense resistor coupled between said output feedback lead and a reference ground rail and a second sense resistor coupled between said second differential input and said reference ground rail, said closed-loop voltage amplifier having a local output terminal coupled to said output feedback lead, a first local input terminal responsive to said first differential input lead and a second local input terminal responsive to said second differential input lead.

8. The voltage-to-current converter of claim 7 wherein said closed-loop voltage amplifier includes a local input resistor and a local feedback resistor, said closed-loop voltage amplifier having a gain magnitude proportional to the ratio of said local feedback resistor to said local input resistor.

9. The voltage-to-current converter of claim 6 wherein said current-to-voltage converter includes a means for sensing said gauge current, a differential amplifier, a local input resistor and a local feedback resistor, said differential amplifier including a positive input terminal, a negative input terminal and a local output terminal, said local input resistor being coupled between said negative input terminal and said means for sensing said gauge current, said local feedback resistor being coupled between said negative input terminal and said local output terminal, said local output terminal being coupled to said output feedback lead and said positive input terminal being coupled to said first differential input.

10. A voltage-to-current converter with a feedback network comprising:

a direct amplifier having an input voltage node, a reference voltage node and an output node, said direct amplifier being effective for generating an output current on said output node, said output current being proportional to a voltage difference between said input voltage node and said reference voltage node, said output current having a DC output current component and an AC output current component, said direct amplifier including at least a first stage and a second stage, said first stage being a voltage-to-voltage converter coupled to said input voltage node and said reference voltage node, said voltage-to-voltage converter being effective for generating an intermediate voltage signal proportional to a voltage difference between said input voltage node and said reference voltage node, said second stage being a transconductance amplifier responsive to said intermediate voltage and being effective for generating said output current, said output current being proportional to said intermediate voltage signal, and a current-to-voltage converter responsive to said output current and being effective for generating a feedback voltage signal proportional only to said AC output current component, said feedback voltage signal being coupled to said reference voltage node of said direct amplifier.

11. The voltage-to-current converter of claim 10 wherein said first stage of said two-stage direct amplifier has feedback.

12. The voltage-to-current converter of claim 10 wherein said second stage of said two-stage direct amplifier has local degenerative feedback.

13. The voltage-to-current converter of claim 10 wherein said transconductance amplifier has an output node and a current source, said current source feeding into said output node.

14. A voltage-to-current converter with an overall feedback network comprising:

a direct amplifier having an input voltage node and a first reference voltage node, said direct amplifier being effective for generating an output current proportional to a voltage difference between said input voltage node and said first reference voltage node, said output current having a DC output current component and an AC output current component, and means for generating a sense signal proportional to said output current, said sense signal having a DC sense component proportional to said DC output current component and an AC sense component proportional to said AC output current component; and an active negative feedback network having:

(a) a voltage amplifier having a first differential input terminal, a second differential input terminal and a local output terminal, said voltage amplifier being effective for generating a feedback voltage signal on said local output terminal, said feedback voltage signal being proportional to a voltage difference between said first and second differential input terminals, said feedback voltage signal being coupled to said first reference voltage node of said direct amplifier;

(b) a means for generating a bias signal substantially similar to said DC sense component, said bias signal being coupled to said first differential input terminal;

(c) a local input resistor coupled between said second differential input terminal and said means for generating a sense signal; and (d) a local feedback resistor coupled between said second differential input terminal and said local output terminal.

15. The voltage-to-current converter of claim 14 wherein said active negative feedback network has a feedback gain magnitude dependent only on the resistive values of said local input resistor and said local feedback resistor, said feedback gain magnitude being independent of said direct amplifier.

16. The voltage-to-current converter of claim 14 wherein said direct amplifier includes at least a first stage and a second stage, said first stage having a voltage-to-voltage converter coupled to said input voltage node and said first reference voltage node, said voltage-to-voltage converter being effective for generating an intermediate voltage proportional to a voltage difference between said input voltage node and said first reference voltage node, said second stage being responsive to said intermediate voltage and having a transconductance amplifier having a second reference voltage node and being effective for generating a transconductance current proportional to a voltage difference between said intermediate voltage and said second reference voltage node, said transconductance current supplying said output current.

17. The voltage-to-current converter of claim 16 wherein said means for generating a sense signal includes a sense resistor coupled between said second reference node of said transconductance amplifier and a reference ground.

18. The voltage-to-current converter of claim 17 wherein said transconductance amplifier includes a local degenerative feedback network.

19. The voltage-to-current converter of claim 17 further having a first sense resistor coupled between said first reference voltage node and a reference ground, and a second sense resistor coupled between said second reference voltage node and said reference ground.

20. The voltage-to-current converter of claim 19 wherein said active negative feedback network has a gain magnitude substantially equal to the resistive values of said second sense resistor multiplied by said local feedback resistor and divided by said local input resistor.

21. The voltage-to-current converter of claim 19 wherein said voltage-to-voltage converter includes a local degenerative feedback network, said first sense resistor being integral to said local degenerative resistive feedback network.

22. A voltage-to-current converter with feedback comprising:

a direct amplifier having at least a first stage and a second stage, said first stage including a voltage-to-voltage converter having an input voltage node, a first reference voltage node and a first degenerative feedback resistor, said first degenerative feedback resistor being coupled between said first reference voltage node and a reference ground rail, said voltage-to-voltage converter being effective for generating an intermediate voltage proportional to a voltage difference between said input voltage node and said first reference voltage node, said second stage being responsive to said intermediate voltage and including a transconductance amplifier having a second reference voltage node, a second degenerative feedback resistor and an output current terminal, said second degenerative feedback resistor being coupled between said second reference voltage node and said reference ground rail, said transconductance amplifier being effective for generating an output current on said output current terminal, said output current being proportional to a voltage difference between said intermediate voltage and said second reference voltage node, said output current having a DC output current component and an AC output current component, said second degenerative feedback resistor generating a voltage sense signal having a DC sense component proportional to said DC output current component and an AC sense component proportional to said AC output current component; and an active feedback network having:

(a) a differential amplifier having a first local input lead, a second local input lead and a local output lead, said local output lead being coupled to said first reference voltage node of said voltage-to-voltage converter;

(b) a means for generating a bias signal substantially similar to said DC sense component, said bias signal being coupled to said first local input lead;

(c) a local input resistor coupled between said second local input lead and said second reference node of said transconductance amplifier, and (d) a local feedback resistor coupled between said second local input lead and said local output lead.

23. The voltage-to-current converter of claim 22 wherein said voltage-to-voltage converter includes a pull-up resistor and an MOS transistor having a control gate electrode coupled to said input voltage node, a source electrode coupled to first reference voltage node and a drain electrode generating said intermediate voltage, said pull-up resistor coupled to said drain electrode.

24. A voltage-to-current converter with feedback comprising:

a direct amplifier having at least a first stage and a second stage, said first stage including a voltage-to-voltage converter having an input voltage node, a first reference voltage node and a first degenerative feedback resistor, said first degenerative feedback resistor being coupled between said first reference voltage node and a reference around rail, said voltage-to-voltage converter being effective for generating an intermediate voltage proportional to a voltage difference between said input voltage node and said first reference voltage node, said second stage being responsive to said intermediate voltage and including a transconductance amplifier having a second reference voltage node, a second degenerative feedback resistor and an output current terminal, said second degenerative feedback resistor being coupled between said second reference voltage node and said reference ground rail, said transconductance amplifier being effective for generating an output current on said output current terminal, said output current being proportional to a voltage difference between said intermediate voltage and said second reference voltage node, said output current having a DC output current component and an AC output current component, said second degenerative feedback resistor generating a voltage sense signal having a DC sense component proportional to said DC output current component and an AC sense component proportional to said AC output current component, said second stage further having a bias source and said transconductance amplifier having an input stage and a current source, said input stage having a first current lead coupled to said output current terminal, a second current lead coupled to said second reference voltage node and a control terminal responsive to said intermediate voltage, said control terminal being effect for varying an amount of current conduction between said first current lead and said second current lead, said current source being coupled to feed into said output current terminal and further having a quiescent operating point establish by said bias source, said bias source having a structure identical to that of said transconductance amplifier; and an active feedback network having:

(a) a differential amplifier having a first local input lead, a second local input lead and a local output lead, said local output lead being coupled to said first reference voltage node of said voltage-to-voltage converter;

(b) a means for generating a bias signal substantially similar to said DC sense component, said bias signal being coupled to said first local input lead;

(c) a local input resistor coupled between said second local input lead and said second reference node of said transconductance amplifier, and (d) a local feedback resistor coupled between said second local input lead and said local output lead.

25. The voltage-to-current converter of claim 24 wherein said bias source also functions as said means for generating a bias signal.

26. The voltage-to-current converter of claim 24 wherein said input stage is one of an unregulated cascode circuit a regulated cascode circuit.

27. The voltage-to-current converter of claim 24 wherein said current source is one of an unregulated cascode current source and a regulated cascode current source.

28. A voltage-to-current converter with a feedback network comprising:

a first direct amplifier having a first input voltage node and a first reference voltage node, said first direct amplifier being effective for generating a first output current proportional to a first voltage difference between said first input voltage node and said first reference voltage node, said first output current having a first DC output current component and a first AC output current component;

a second direct amplifier having a second input voltage node and a second reference voltage node, said second direct amplifier being effective for generating a second output current proportional to a second voltage difference between said second input voltage node and said second reference voltage node, said second output current having a second DC output current component and a second AC output current component; and a differential current-to-voltage converter responsive to said first and second output currents and effective for generating a first feedback voltage signal proportional to a difference of said first and second output currents and effective for generating a second feedback voltage signal proportional to said difference of said first and second output currents, said first feedback voltage signal being coupled to said first reference voltage node and said second feedback voltage signal being coupled to said second reference voltage node.

29. The voltage-to-current converter of claim 28 wherein said first output current is 180° out of phase with said second output current and said first feedback voltage signal is 180° out of phase with said second feedback voltage signal.

30. The voltage-to-current converter of claim 28 further including:

a first means for generating a first sense signal proportional to said first output current, said first sense signal having a first DC sense component proportional to said first DC output current component and a first AC sense component proportional to said first AC output current component;

a second means for generating a second sense signal proportional to said second output current, said second sense signal having a second DC sense component proportional to said second DC output current component and a second AC sense component proportional to said second AC output current component; and a dual output differential amplifier having a first input lead coupled to said first sense signal and a second input lead coupled to said second sense signal, a first output lead generating said first feedback voltage signal and a second output lead generating said second feedback voltage signal.

31. The voltage-to-current converter of claim 30 wherein said first DC sense component is substantial similar to said second DC sense component.

32. The voltage-to-current converter of claim 30 wherein said first means for generating a first sense signal includes a first sense resistor and said second means for generating a second sense signal includes a second sense resistor.

33. The voltage-to-current converter of claim 30 wherein said dual output differential amplifier includes a local resistive feedback network, the gain magnitude of said dual input differential amplifier being dependent only on said resistive feedback network.

34. The voltage-to-current converter of claim 30 wherein said dual output differential amplifier includes a first input resistor coupled between said first input lead and said first means for generating a first sense signal, a first feedback resistor coupled between said first output lead and said first input lead, a second input resistor coupled between said second input lead and said second means for generating a second sense signal and a second feedback resistor coupled between said second output lead and said second input lead.

35. The voltage-to-current converter of claim 28 wherein said first direct amplifier includes at least a first input stage and a first output stage, said first input stage having a first voltage-to-voltage converter coupled to said first input voltage node and said first reference voltage node and being effective for generating a first intermediate voltage proportional to the voltage difference between said first input voltage node and said first reference voltage node, said first output stage having a first transconductance amplifier responsive to said first intermediate voltage and being effective for generating said first output current, and said second direct amplifier further includes at least a second input stage and a second output stage, said second input stage having a second voltage-to-voltage converter coupled to said second input voltage node and said second reference voltage node and being effective for generating a second intermediate voltage, said second output stage having a second transconductance amplifier responsive to said second intermediate voltage and being effective for generating said second output current.

* * * * *